W. H. H. WHITING.
Electric Gas-Lighting Apparatus.
No. 213,795.  Patented April 1, 1879.
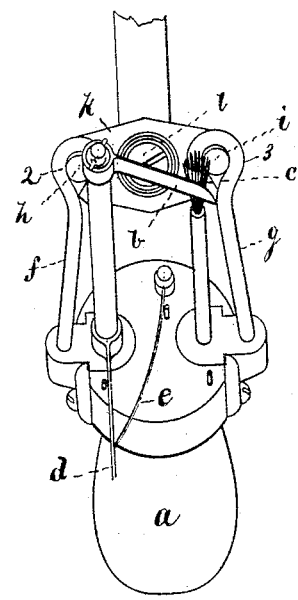
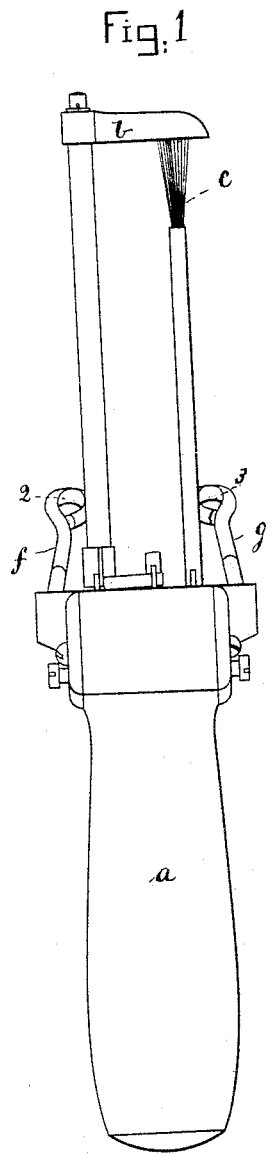
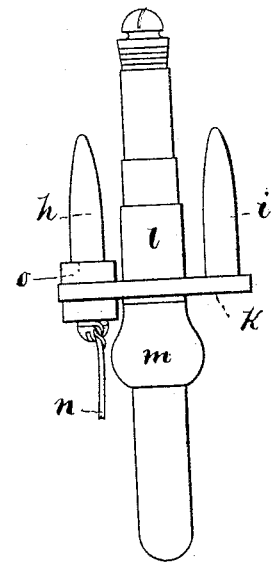
Witnesses:
N. E. Whitney
L. F. Conant
Inventor
William H. H. Whiting
by Crosby & Gregory, Attys

UNITED STATES PATENT OFFICE.

WILLIAM H. H. WHITING, OF CHELSEA, MASSACHUSETTS.

IMPROVEMENT IN ELECTRIC GAS-LIGHTING APPARATUS.

Specification forming part of Letters Patent No. 213,795, dated April 1, 1879; application filed February 3, 1879.

*To all whom it may concern:*

Be it known that I, WM. H. H. WHITING, of Chelsea, county of Suffolk, and State of Massachusetts, have invented an Improvement in Gas-Lighting Apparatus, of which the following description, in connection with the accompanying drawings, is a specification.

This invention relates to an apparatus for lighting gas by means of electricity. In this apparatus I have combined with the gas-burner, or with a suitable support, located preferably at or near the base of the burner, a terminal plate having a positive and negative pole, one of which is insulated from the said terminal plate, and by means of a circuit-closer connected with an independent hand-moved device or handle, provided with two electrodes, one of which is made to pass by or touch the other. I connect the positive and negative poles of the terminal plate, and as the electrodes are brought together and separated a spark is formed sufficient to light the gas issuing from the burner.

In a patent of the United States granted to me November 5, 1878, and to which reference may be had, I have described a hand-operated device provided with a movable and a brush-like electrode, and placed in electric circuit with a battery by means of a suitable wire.

In this my present invention I employ substantially such a hand-operated device or handle and electrodes as are shown and described in the said patent; but instead of placing the handle in electric circuit by means of a wire, as in the said patent, one handle and two electrodes being needed for one gas-fixture, unless quite close together, I have entirely disconnected the handle and electrodes from the wire which keeps them in electric circuit, and have placed upon the handle two circuit-closers, one in metallic connection with each electrode, and have so placed them that they may be hooked upon or engaged with the positive and negative poles of the terminal plate fixed in position at or near the burner, the said plate being in circuit, to thereby connect the said positive and negative poles, and enable the circuit to be completed by the passage of the electric current through the electrodes.

This my present invention enables me, by means of a single hand operated or moved device provided with circuit-closers and electrodes, to light, one after another, any number of burners which are in electric circuit.

Figure 1 represents, in elevation, one of my independent hand-moved or handled devices containing two circuit-closers and two electrodes. Fig. 2 represents a gas-burner and fixed terminal plate provided with positive and negative pole-pieces, and in electric circuit with a battery; and Fig. 3 is a top view, representing the hand-moved or handled device applied to the terminal plate to place the electrodes in circuit.

The handle $a$, movable electrode $b$ and brush-like electrode $c$, the thumb-piece $d$, and spring $e$ are and may be as described and represented in my patent, to which reference has been heretofore made. This handle $a$, or it may be a handle or portion of any other shape which may be readily grasped by hand, is in this my present invention provided with two metallic arms, $f\,g$, the one $f$ in metallic connection with the electrode $b$ and the one $g$ with the electrode $c$. These arms—denominated by me as "circuit-closers"—are shown as provided with eyes 2 3, to fit over the posts or projections $h$ $i$, which form part of the terminal plate $k$, located at the base of the gas-burner $l$, or between it and the part $m$ of the gas-fixture, the object being to provide each gas-burner with a terminal plate having a positive and negative pole or projection, $h\,i$, one of which is insulated from the post $k$, and one of which is connected by a wire, $n$, with a battery in any usual way, so as to place all the burners to be lighted in an electric circuit. The pole $h$ is shown as insulated from $k$ by means of a block of a vulcanized india-rubber, $o$.

To light the gas, the device provided with the electrodes and circuit-closers $f\,g$ is grasped in the hand, and is applied in succession to the positive and negative poles of each terminal plate $k$ by placing the eyes 2 3 over the posts or projections $h\,i$, as in Fig. 3, when, by tipping the handle so as to place the electrode $c$ in the path of the gas issuing from the top of the burner, and turning the movable electrode $b$ so as to pass $c$, a spark or sparks will be created which will light the gas.

By this device the use of matches is obviated, and the mill-operatives are enabled to light the gas, for the handle and attached electrodes will be kept in charge of the overseer or other properly-designated person, whose business it is to light gas whenever required.

I claim—

1. The terminal plate $k$, the positive and negative poles $h\ i$, the insulator $o$, applied to one only of said poles, and the battery-wire $n$, in combination with a gas-burner, substantially as and for the purpose described.

2. The independent handle-piece provided with two electrodes and with two circuit-closers, to operate substantially as described.

3. In a gas-lighting apparatus, a handle-piece provided with two electrodes and two circuit-closers, combined with a terminal plate, to be located at or near a gas-burner, and provided with a positive and negative pole, to be engaged or placed in contact with the two circuit-closers of the handle-piece, to enable the handle and electrode to be placed in electric circuit with a battery, to create a spark and light the gas as the electrodes are moved from contact, substantially as described.

In testimony whereof I have signed my name to this specification in the presence of two subscribing witnesses.

WM. H. H. WHITING.

Witnesses:
G. W. GREGORY,
L. F. CONNORS.